United States Patent [19]

Reade

[11] 4,047,960

[45] Sept. 13, 1977

[54] REFRACTORY PARTIALLY CRYSTALLINE MATERIALS WITH GOOD VISIBLE TRANSPARENCY

[75] Inventor: Richard F. Reade, Corning, N.Y.

[73] Assignee: Corning Glass Works, Corning, N.Y.

[21] Appl. No.: 697,315

[22] Filed: June 18, 1976

[51] Int. Cl.² .......................... C03C 3/22; C03B 32/00
[52] U.S. Cl. ........................................ 106/39.8; 65/33
[58] Field of Search ................... 65/33; 106/39.6, 39.8

[56] References Cited

U.S. PATENT DOCUMENTS

| | | | |
|---|---|---|---|
| 3,732,116 | 5/1973 | Reade | 65/33 X |
| 3,839,053 | 10/1974 | Rittler | 65/33 X |
| 3,951,670 | 4/1976 | Bush | 65/33 X |
| 3,977,886 | 8/1976 | Muller | 106/39.8 |
| 3,984,251 | 10/1976 | Rapp | 106/39.6 |

*Primary Examiner*—S. Leon Bashore
*Assistant Examiner*—Frank W. Miga

*Attorney, Agent, or Firm*—Clinton S. Janes, Jr.; Clarence R. Patty, Jr.

[57] ABSTRACT

This invention is concerned with the manufacture of refractory articles of a partially crystalline nature, i.e., materials having a substantial crystal content within a glassy matrix, but wherein the crystal phase normally comprises less than about 50% by volume of the materials. The bodies are produced through the heat treatment of glass articles having compositions within the $Al_2O_3$—$SiO_2$—$TiO_2$—$Nb_2O_5$ and/or $Ta_2O_5$ system at elevated temperatures, but not in excess of about 1150° C., to cause the in situ growth of crystals. The materials, containing aluminum niobate, aluminum tantalate, or an aluminum niobate-tantalate solid solution as the predominant crystal phase, exhibit a high degree of transparency to visible light, and retain that transparency even after very extended exposures to temperatures up to in excess of 1000° C. That capability has recommended their utility as arc-tubes or as envelopes for high temperature lamps.

3 Claims, No Drawings

REFRACTORY PARTIALLY CRYSTALLINE MATERIALS WITH GOOD VISIBLE TRANSPARENCY

OBJECTIVE OF THE INVENTION

The use of high temperature lamps has steadily increased in recent years, particularly for highway and other outdoor lighting purposes. Since the efficiency of such lamps increases with higher temperatures, there has been a real need for transparent materials capable of withstanding temperatures of 1000° C. and higher without deformation. Fused quartz and sintered alumina materials have been and are being employed for such applications, but these are very expensive and difficult to form.

Therefore, the principal objective of the instant invention is to provide a transparent partially crystalline material which, being produced from a glass, can be easily shaped into an envelope for a high temperature lamp, and which resists deformation up to temperatures of 1000° C. and higher.

SUMMARY OF THE INVENTION

The above objective can be achieved by the controlled heat treatment of glass articles consisting essentially, in weight percent on the oxide basis, of about 10-20% $Al_2O_3$, 59-72% $SiO_2$, 5-8% $TiO_2$, and 5-20% $Nb_2O_5$ and/or $Ta_2O_5$ 0 to about 2% $K_2O$ and/or 0 to about 6% $Cs_2O$. The method of the invention comprises three general steps. First, a glass-forming batch of a proper composition is melted. Second, the melt is simultaneously cooled to a glass at a temperature at least within the transformation range and an article of a desired configuration shaped therefrom. Third, the glass article is subjected to a temperature between about 1000°-1150° C. to cause the in situ growth of crystals within the glass. In the preferred practice to attain a more dense and more uniformly-sized crystallization, the crystallization process is divided into two parts. Thus, the glass article is first heated to about 800°-1000° C. to effect substantial nucleation within the glass and, subsequently, the nucleated glass is heated to about 1000°-1150° C. to cause the growth of crystals on the nuclei.

The materials contain a substantial crystal content homogeneously dispersed within a residual glassy matrix, the crystals generally constituting at least about 20%, but less than about 50% by volume, of the materials. Aluminum niobate, aluminum tantalate, or an aluminum niobate-tantalate solid solution comprises the predominant crystal phase. The crystals are much smaller in size than the wavelength of visible light, being only about 300-500A in diameter.

The materials exhibit coefficients of thermal expansion over the range of room temperature (R.T.) to 1000° C. of less than about $30 \times 10^{-7}/°$ C. and can demonstrate a high degree of transparency to visible light, particularly within the range of 4500-7500A, which is retained even after extended exposures to temperatures up to 1000° C.

$TiO_2$ functions as a flux, enabling the glass batch to be melted at temperatures of about 1650°-1700° C. Without the presence of $TiO_2$, temperatures in excess of 1800° C. would be required for melting the batch, thereby foreclosing the use of conventional glass melting facilities and practies.

Extended exposures of the transparent materials to temperatures above 1150° C. cause the development of translucency therewithin. This phenomenon results from the growth in situ of mullite and/or cristobalite crystals in addition to the aluminum niobate and/or tantalate. The materials become opaque due to increased crystallinity (in excess of 50% by volume) and the larger size of the mullite and/or cristobalite crystals, i.e., greater than the wavelength of visible light.

Substantial opacity is developed within a relatively brief time at temperatures of 1200° C. and higher. In addition, the presence of mullite and/or cristobalite causes the coefficient of thermal expansion over the range of R.T. to 1000° C. to rise about $30 \times 10^{-7}/°$ C.

The inclusion of up to about 2% $K_2O$ and/or up to about 6% $Cs_2O$ can be advantageous in inhibiting the growth of cristobalite. The presence of cristobalite causes a marked increase in the coefficient of thermal expansion of the materials. The extensive growth of cristobalite during exposure to high temperatures can lead to cracking and spalling of the surface as the crystallized article is cooled to room temperature.

DESCRIPTION OF PREFERRED EMBODIMENTS

Table I records compositions, expressd in parts by weight on the oxide basis, that are useful in the instant invention. Inasmuch as the sum of the various ingredients approximates 100 in each example, the individual values can, for all practical purposes, be deemed to be reported in percent by weight. The actual batch ingredients can comprise any materials, either the oxide or other compound, which, when melted together, will convert to the desired oxide in the proper proportions.

The batch materials were compounded, ballmilled together to aid in securing a homogeneous melt, and run into platinum crucibles. After placing a lid thereon, the crucibles were inserted into an electrically-fired furnace operating at about 1700° C. and held therein for about 16 hours. The melts were poured into a steel mold to yield glass slabs about 6 × 6 × ½ inch and the slabs immediately transferred to an annealer operating at about 700° C. Upon completion of annealing, samples were cut from each slab in the proper geometry for physical property measurements to be conducted thereon. $As_2O_3$ was included in its conventional function as a fining agent.

TABLE I

|  | 1 | 2 | 3 | 4 | 5 |
|---|---|---|---|---|---|
| $SiO_2$ | 68.0 | 70.5 | 69.2 | 64.6 | 66.8 |
| $Al_2O_3$ | 16.5 | 15.0 | 14.7 | 15.7 | 14.2 |
| $Nb_2O_5$ | 8.6 | 7.8 | 7.7 | 15.7 | 14.2 |
| $TiO_2$ | 6.9 | 6.3 | 6.1 | 10.9 | 7.4 |
| $As_2O_3$ | 0.4 | 0.5 | 0.5 | 6.5 | 5.9 |
| $K_2O$ | — | — | — | 0.5 | 0.5 |
| $Cs_2O$ | — | — | 1.8 | 1.9 | 5.2 |

|  | 6 | 7 | 8 | 9 | 10 |
|---|---|---|---|---|---|
| $SiO_2$ | 62.2 | 63.5 | 62.3 | 60.1 | 64.4 |
| $Al_2O_3$ | 15.1 | 15.4 | 15.1 | 14.6 | 15.6 |
| $Nb_2O_5$ | 10.5 | 5.4 | 5.3 | 5.1 | — |
| $Ta_2O_5$ | — | 8.9 | 8.7 | 8.4 | 13.5 |
| $TiO_2$ | 6.2 | 6.4 | 6.3 | 6.1 | 6.5 |
| $As_2O_3$ | 0.5 | 0.5 | 0.5 | 0.5 | 0.4 |
| $K_2O$ | — | — | 1.9 | — | — |
| $Cs_2O$ | 5.6 | — | — | 5.4 | — |

|  | 11 | 12 | 13 | 14 | 15 |
|---|---|---|---|---|---|
| $SiO_2$ | 67.1 | 63.0 | 61.6 | 67.4 | 65.7 |
| $Al_2O_3$ | 14.2 | 17.3 | 14.9 | 14.3 | 13.8 |
| $Ta_2O_5$ | 12.3 | 13.2 | 17.2 | 12.4 | 13.8 |
| $TiO_2$ | 5.9 | 6.4 | 6.2 | 6.0 | 6.7 |
| $As_2O_3$ | 0.5 | 0.4 | 0.4 | 0.4 | 0.4 |

The heat treatment step is time and temperature dependent. Thus, at the higher extreme of the 1000° C., but no higher than about 1150° C., range, an exposure of 1-4 hours may be sufficient to insure the growth of aluminum niobate and/or aluminum tantalate crystals, whereas at the cooler extreme 24-48 hours may be required. In the laboratory examples discussed above, the glass bodies were annealed to room temperature to permit inspection of glass quality and for ease in cutting test samples. Such is not a mandatory practice. All that is required is that the melt be cooled to at least within the transformation range to produce an essentially crystal-free glass, and then the glass reheated to cause crystallization in situ. The transformation range has generally been defined as that temperature at which a molten mass is converted into an amorphous body, this temperature commonly being considered to lie in the vicinity of the annealing point of the glass.

Table II records heat treatments applied to the compositions of Table I along with a visual description of the crystalline product, a definition of the crystal phases present as identified through X-ray diffraction analyses, coefficients of thermal expansion over the range of R.T. to 1000° C. ($\times 10^{-7}$/° C.), as determined in accordance with conventional measuring techniques, and the transmittance to visible light having a wavelength of 5500° C., measured spectrophotometrically through polished samples 1 mm. or 2 mm. thick as crystallized examples and after exposure to 1010° C. for 200 or 500 hours. In each instance an electrically-fired furnace was employed and the temperature thereof raised at a rate of about 100°–300° C./hour to the hold temperatures reported. It will be appreciated, of course, that no hold temperature, as such, is required; such is only a matter of convenience. All that is necessary is the exposure of the precursor glass body to temperatures within the 1000°–1150° C. range. The rate at which the glass temperature is raised is governed by the tendency of the body to deform or slump. Where formers or other physical supports are employed, rates of 10° C./minute and faster may be utilized. Heat treatments up to 100° C. which yield opaque, fine-grained bodies are included for comparison.

In each instance, the crystalline bodies were cooled to room temperature by merely cutting off the electricity to the furnace and allowing the furnace to cool with the bodies retained therein. This rate of cooling was estimated to average about 3°–5° C./minute. Since the coefficient of thermal expansion of the transparent crystalline bodies is quite low, commonly about 20–25 $\times$ $10^{-7}$/° C., much more rapid rates of cooling are obviously operable. This "cooling at furnace rate" is a matter of convenience in the laboratory.

However, it is believed that both the rate of heating the glass article to effect crystallization and the rating of cooling the crystallized body to room temperature are well within the technical ingenuity of the person of ordinary skill in the art.

TABLE II

| Example No. | Heat Treatment | Description | Crystal Phases | Coef. Exp. | Thickness | % Transmittance at 5500Å As Crystallized | 1010° C | Hours |
|---|---|---|---|---|---|---|---|---|
| 1 | 300° C/hr to 850° C, Hold for 2 hours, 200° C/hr to 1000° C, Hold for 2 hours 200° C/hr to 1100° C, Hold for 16 hours | Transparent, very slight haze | Aluminum niobate | 24.0 | 2 mm | 74% | — | — |
| 1 | 300° C/hr to 850° C, Hold for 2 hours 200° C/hr to 1000° C, Hold for 2 hours 200° C/hr to 1200° C, Hold for 16 hours | White, opaque | Cristobalite, Mullite, Aluminum niobate | — | — | — | — | — |
| 2 | 300° C/hr to 850° C, Hold for 2 hours 200° C/hr to 1000° C, Hold for 2 hours 200° C/hr to 1100° C, Hold for 16 hours | Transparent, very slight haze | Aluminum niobate | 20.4 | 2 mm | 77% | 76% | 200 |
| 2 | 300° C/hr to 1000° C Hold for 4 hours 200° C/hr to 1200° C, Hold for 4 hours | Gray, opaque | Cristobalite, Mullite, Aluminum niobate | — | — | — | — | — |
| 3 | 300° C/hr to 850° C Hold for 2 hours 200° C/hr to 100° C Hold for 2 hours 200° C/hr to 1100° C Hold for 16 hours | Transparent, slight haze | Aluminum niobate | — | 2 mm. | 71% | — | — |
| 3 | 300° C/hr to 100° C Hold for 4 hours 200° C/hr to 1200° C Hold for 4 hours | Gray, opaque | Cristobalite, Mullite, Aluminum niobate | — | 2 mm. | 63% | — | — |
| 4 | 300° C/hr to 850° C Hold for 2 hours 200° C/hr to 1000° C Hold for 2 hours 200° C/hr to 1100° C Hold for 16 hours | Transparent-to-translucent | Aluminum niobate | — | 2 mm. 1 mm. | 81% 86% | 80% 83% | 200 500 |
| 5 5 | 200° C/hr to 1050° C Hold for 4 hours 100° C/hr to 1150° C Hold for 4 hours | Transparent Transparent | Aluminum niobate | 23.7 | 2 mm. | 69% | — | — |
| 6 | 300° C/hr to 850° C Hold for 2 hours 200° C/hr to 1000° C Hold for 2 hours 200° C/hr to 1100° C Hold for 16 hours | Transparent, slight haze | Aluminum niobate | — | 1 mm. | 80% | 76% | f 500 |
| 6 | 200° C/hr to 1050° C | Transparent, | Aluminum | 27.2 | | | | |

TABLE II-continued

| Example No. | Heat Treatment | Description | Crystal Phases | Coef. Exp. | Thickness | % Transmittance at 5500Å As Crystallized | 1010° C | Hours |
|---|---|---|---|---|---|---|---|---|
|  | Hold for 4 hours 100° C/hr to 1150° C Hold for 4 hours | slight haze | niobate |  |  |  |  |  |
| 7 | 300° C/hr to 850° C Hold for 2 hours 200° C/hr to 1000° C Hold for 2 hours 200° C/hr to 1100° C Hold for 16 hours | Transparent, slight haze | Aluminum niobate-tantalate solid solution | 24.4 | — | — | — | — |
| 8 | " | Transparent-to-translucent | Aluminum niobate-tantalate solid solution, Rutile | — | 2 mm. | 52% | — |  |
| 9 | 300° C/hr to 850° C Hold for 2 hours 200° C/hr to 1000° C Hold for 2 hours 200° C/hr to 1100° C Hold for 16 hours | Transparent, slight haze | Aluminum niobate-tantalate solid solution | — | 2 mm. | 77% | 71% | 200 |
| 9 | 200° C/hr to 1050° C Hold for 4 hours 1000° C/hr to 1150° C Hold for 4 hours | Transparent | " | 27.2 | 1 mm. | 84% | 81% | 500 |
| 9 | 300° C/hr to 1000° C Hold for 4 hours 200° C/hr to 1200° C Hold for 4 hours | Gray, opaque | Cristobalite, Aluminum niobate-tantalate solid solution | — | — | — | — | — |
| 10 | 300° C/hr to 850° C Hold for 2 hours 200° C/hr to 1000° C Hold for 2 hours 200° C/hr to 1100° C Hold for 16 hours | Transparent slight haze | Aluminum tantalate, Rutile | 24.6 | — | — | — | — |
| 10 | 300° C/hr to 850° C Hold for 2 hours 200° C/hr to 1000° C Hold for 2 hours 200° C/hr to 1200° C Hold for 16 hours | White, opaque Mullite, | Cristobalite Aluminum tantalate, Rutile | — | — | — | — | — |
| 11 | 300° C/hr to 850° C Hold for 2 hours 200° C/hr to 1000° C Hold for 2 hours 200° C/hr to 1100° C Hold for 16 hours | Transparent, very slight haze | Aluminum tantalate, Rutile | 24.1 | 2 mm. | 76% | 72% | 200 |
| 11 | 300° C/hr to 1000° C Hold for 4 hours 200° C/hr to 1200° C Hold for 4 hours | Gray, translucent-to-opaque | Cristobalite, Alumimum tantalate, Rutile | — | — | — | — | — |
| 12 | 300° C/hr to 850° C Hold for 2 hours 200° C/hr to 1000° C Hold for 2 hours 200° C/hr to 1100° C Hold for 16 hours | Transparent, very slight haze | Aluminum tantalate Rutile | — | — | — | — | · |
| 13 | " | " | " | — | — | — | — | — |
| 14 | " | Transparent | " | — | — | — | — | — |
| 15 | " | " | " | — | — | — | — | — |

Table II clearly illustrates the criticality of heat treatment temperature required to assure the production of transparent articles. The preferred compositions for the transparent materials consist essentially solely of the quaternary $Nb_2O_5$ and/or $Ta_2O_5$—$Al_2O_3$—$SiO_2$—$TiO_2$, since additions of other ingredients can have an adverse effect upon transparency and/or refractoriness. This is particularly true of such conventional fluxing agents as the alkali metal oxides, $B_2O_3$, $P_2O_5$, and fluoride. Therefore, the preferred compositions will be essentially free from such ingredients. Likewise, such divalent metal oxides as the alkaline earths and PbO, which can form unwanted secondary crystal phases, will preferably be absent. Up to 2% $K_2O$ and/or up to 6% $Cs_2O$ may be added to inhibit cristobalite formation. In sum, the total of all extraneous oxides, if present, will not exceed about 8% by weight.

Although the transmittances thereof were not measured spectrophotometricallly, Examples 1, 10, 12, and 13, when subjected to a top heat treatment temperature of 1100° C., evidenced neither a visible loss of transmittance nor physical deformation and slumping after an exposure of 350 hours at a temperature of 1010° C.

The identification of "rutile" in Examples 8 and 10–16 is not positive but the phase may be (1) $TiO_2$, (2) a form of aluminum tantalate, or (3) a solid solution of these two. The X-ray patterns of rutile, a tetragonal form of $TiO_2$, and that of the tetragonal form of $AlTaO_4$ are substantially identical. In the latter phase, $Al^{+3}$ and $Ta^{+5}$ ions occupy alternate positions in the crystal lattice in a manner similar to those occupied by $Ti^{+4}$ ions in rutile. The identification of $AlTaO_4$ in Table II refers to the orthorhombic form thereof.

I claim:

1. A method for making a transparent partially crystalline article containing at least about 20%, but less than about 50%, by volume crystals dispersed within a residual glassy matrix wherein the predominminant crystal phase consists essentially of aluminum niobate, aluminum tantalate, or an aluminum-tantalate solid solution having a crystal size of about 300–500A in diameter, which crystalline article retains its transparency after extended exposures to temperatures up to about 1150° C., comprising the steps of:

a. melting a batch for a glass consisting essentially, in weight percent on the oxide basis, of about 10-20% $Al_2O_3$, 59-72% $SiO_2$, 5-8% $TiO_2$, and 5-20% $Nb_2O_5$ and/or $Ta_2O_5$ 0 to about 2% $K_2O$ and/or 0 to about 6% $Cs_2O$;

b. simultaneously cooling said melt to a temperature at least within the transformation range and shaping a glass article of a desired configuration therefrom;

c. heating said glass article to a temperature of at least about 1000° c., but not more than about 1150° C., for a period of time sufficient to cause the crystallization of aluminum niobate, aluminum tantalate, and/or an aluminum niobate-tantalate solid solution having a crystal size of about 300-500A to occur in situ to produce a transparent partially crystalline article; and then d. cooling said crystallized article to room temperature.

2. A method according to claim 1 wherein said glass article is first heated to about 800°-1000° C. for a period of time sufficient to effect substantial nucleation within said glass prior to heating to crystallize the glass article in situ.

3. A transparent partially crystalline article made in accordance with claim 1.

* * * * *